United States Patent [19]

Akada et al.

[11] Patent Number: 4,777,504
[45] Date of Patent: Oct. 11, 1988

[54] CAMERA WITH AN AUTOMATIC FOCUSING DEVICE

[75] Inventors: Yasuaki Akada; Minoru Sekida, both of Sakai; Takeshi Egawa, Sennan; Tokuji Ishida, Osaka, all of Japan

[73] Assignee: Minolta Camera Kabushiki Kaisha, Osaka, Japan

[21] Appl. No.: 813,597

[22] Filed: Oct. 11, 1988

[30] Foreign Application Priority Data

Dec. 27, 1984 [JP] Japan ................. 59-198053

[51] Int. Cl.⁴ .............................................. G03B 3/00
[52] U.S. Cl. .................. 354/400; 354/402; 354/409; 354/467; 354/266
[58] Field of Search ............... 354/400, 402, 409, 260, 354/259.1, 467, 266

[56] References Cited

U.S. PATENT DOCUMENTS

| | | | |
|---|---|---|---|
| 4,206,990 | 6/1980 | Imura et al. | 354/266 |
| 4,274,720 | 6/1981 | Tsujimoto | 354/402 |
| 4,295,715 | 10/1981 | Breen | 354/400 |
| 4,459,006 | 7/1984 | Sakai et al. | 354/400 |
| 4,460,258 | 7/1984 | Fukuhara | 354/402 |
| 4,464,037 | 8/1984 | Terui et al. | 354/400 |
| 4,474,447 | 10/1984 | Kawabata et al. | 354/409 |
| 4,491,403 | 1/1985 | Sakai et al. | 354/402 |
| 4,512,646 | 4/1985 | Kitaura et al. | 354/467 |

*Primary Examiner*—Russel E. Adams
*Attorney, Agent, or Firm*—Price, Gess & Ubell

[57] ABSTRACT

A camera provided with an automatic focusing device which automatically detects the focus condition of an objective lens and driving the objective lens towards an in-focus position in response to the manual operation to a shutter release button. The operation of the automatic focusing device is actuated by a switching means when the shutter release button is touched by a user's finger or is depressed down after the touching. When the shutter release button is further depressed beyond the first stroke, the operation of the automatic focusing device is inhibited once an in-focus condition is obtained.

11 Claims, 8 Drawing Sheets

CAMERA WITH AN AUTOMATIC FOCUSING DEVICE

BACKGROUND OF THE INVENTION

1. Field of the Invention

The present invention relates to a camera provided with an automatic focusing device which automatically adjusts the focusing of an object to be photographed, and more particularly it pertains to such a camera with an automatic focusing device comprising an objective lens driving means and a selection means for alternatively selecting a first condition for allowing the objective lens driving even after the detection of an in-focus condition and a second condition for inhibiting the lens driving once an in-focus condition was allowed. While a switching means is closed the lens driving means drives the objective lens in accordance with the judgment of focusing of the objective lens on an object to be photographed.

2. Description of the Prior Art

Conventional cameras are arranged such that the switching means and the selection means are operated by different members. For example, a distance measuring or focusing actuation switch is provided as the switching means and the automatic focusing device always determines in-focus or out-of-focus measuring of the camera-to-object distance and drives the objective lens in accordance with the results of the determination such that the object is within an in-focus range. This is the first condition. In the case, the user wishes to stop the objective lens once and an in-focus condition is attained, e.g. when the user wishes to take a picture of an object locating the latter at a position other than the central portion of th scene to be photographed after the focusing has been adjusted on the object with the image of the object being registered with the focusing area mark or frame at the center of the viewfinder field, a selector means such as a focus-lock switch is operated to change-over the focusing device to the second condition. (See for example Japanese laid-open patent applications with laid-open Nos. 50-99729 and 58-8727)

When the objective lens is driven by an electric means, e.g. an electric motor, the driving requires a considerable amount of current of several ampere. Accordingly, it may be desirable to save the electric energy consumption that the automatic focusing device is normally deenergized and the switching member is closed to actuate the automatic focusing device when the focusing should be adjusted. However, the conventional cameras required operation of both the switching member and the selection member respectively for the focusing and it takes much electrical power for the focusing.

SUMMARY OF THE INVENTION

An object of the present invention is to provide a camera wherein a simple and quick operation will actuate the automatic focusing device and will also switch from one to the other of the two operational conditions.

Another object of the present invention is to provide a camera with an automatic focusing device wherein operation of a single operation member will cause the actuation of the automatic focusing device and the switching between the two conditions.

In a camera with an automatic focusing device according to the present invention, a switching means is closed to actuate the automatic focus detecting device when a shutter release button is touched by a user's finger or is depressed down after the touching. The means for switching the automatic focusing device between the two operational conditions is arranged such that when the shutter release button is depressed by a stroke smaller than a given amount, a lens driving means is allowed to drive the objective lens even after an in-focus condition is detected by the focus detecting means, and that when the shutter release button is depressed further beyond the given stroke, the objective lens driving by means of the lens driving means is inhibited once an in-focus condition is detected by the focus detecting means.

Accordingly, in the camera with the automatic focusing device according to the present invention, operation on the shutter release button will not only actuate the automatic focusing device but also switching the operational condition of the device, thereby enabling easy and quick one-hand operation for bringing the device from a ceased condition to either the continuously focus adjusting condition or a condition in which the focusing is locked once an in-focus condition is attained.

Additionally, if the shutter release button is depressed further for the focus locking condition, shutter release operation will be caused. Thus, the present invention enables a smooth and quick photography or picture taking operation.

These and other objects, features and advantages of the invention will become more apparent upon a reading of the following detailed specification and drawings.

BRIEF DESCRIPTION OF THE DRAWINGS

FIG. 10 is a schematic illustration of a shutter release button and switches and circuits related thereto.

DETAILED DESCRIPTION OF THE PREFERRED EMBODIMENT

Figure 1:
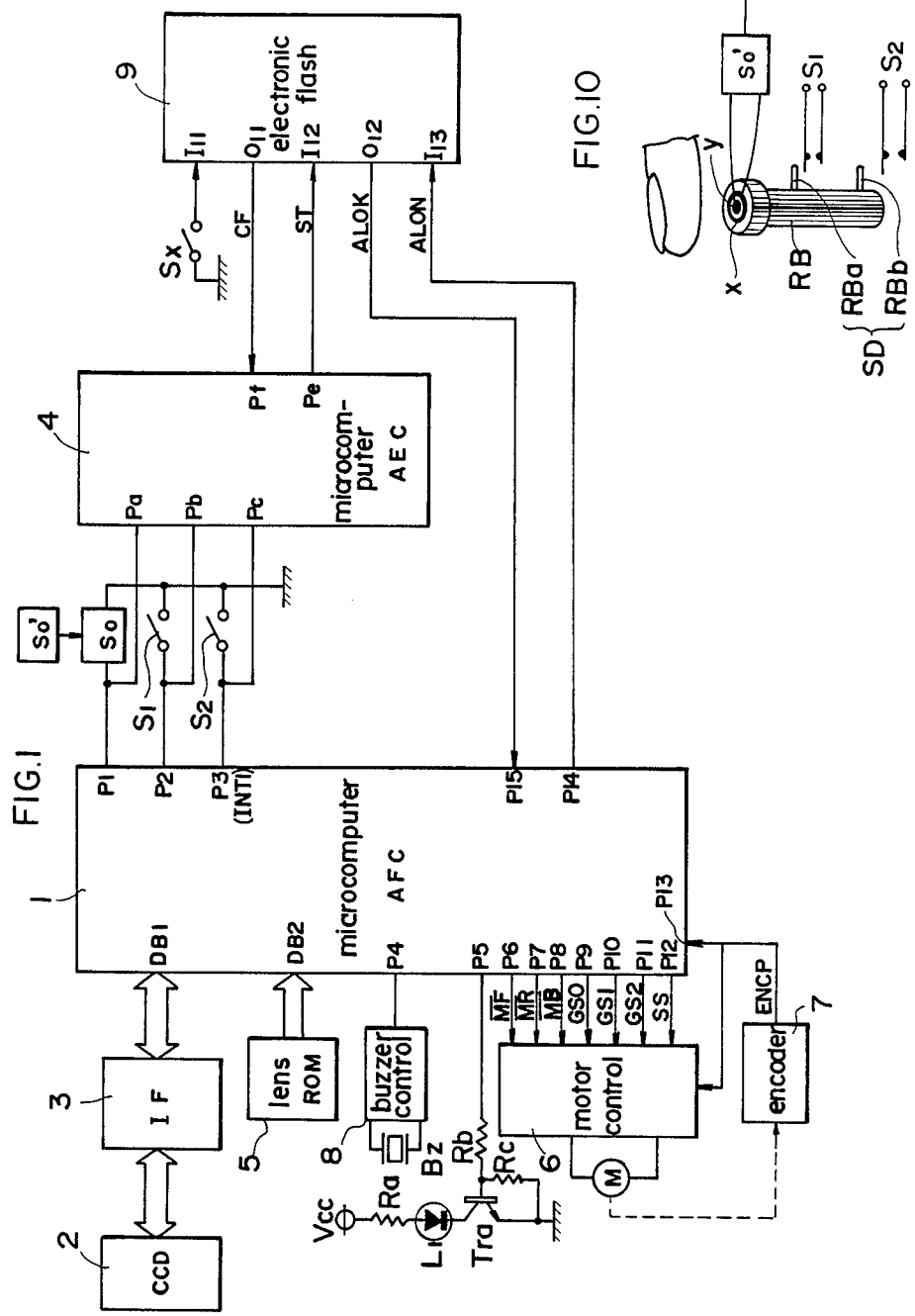
FIG. 1 is a schematic illustration of the general circuit arrangement of an automatic focusing device.

FIG. 1 shows a circuit arrangement of a control device of a camera provided with an automatic focusing device according to the present invention. With reference to the Figure, a microcomputer 1 is provided for the automatic focus control. A solid-state image sensing device 2 such as a charge coupled device (hereinafter referred to as CCD 2) serves as a light detector which measures the brightness distribution of object images respectively formed by light passing through different portions of the exit pupil of a camera objective lens (not shown). An interface circuit 3 is provided between the microcomputer 1 and the CCD2, and includes a circuit for driving the CCD2, AD converter for converting the analog signals from the CCD2 into digital signal, and a circuit for transferring the digital converted data to the microcomputer 1. Another microcomputer 4 serves to control the general operation of the camera and to make exposure calculations. A lens ROM disposed within the camera objective lens 5 is connected to the automatic focusing microcomputer 1 through signal transmission pins provided on the camera body or the objective lens at the interface of them. The lens ROM 5 contains lens data required for the automatic focusing, i.e. the data relating to the composition and optical properties of the camera objective lens and the data of the objective lens driving mechanism such as the reduction gear ration of the transmission therein. A motor driving control circuit 6 controls the speed of revolution of a motor M in compliance with a command from the microcomputer 1. The motor M is adapted to drive the objective lens or a part thereof through the transmission. An encoder circuit 7 is composed of a combination of a disk with several notches on its periphery and a photo-interrupter, and generates pulses of the number commensurate with the amount of revolutions of the motor M such that the data of the revolution speed and amount for the motor M are transmitted to the motor driving control circuit 6 and the microcomputer 1. It is apparent to those skilled in the art that the encoder may have another form. A buzzer control circuit 8 is connected at its output with a sound generator BS such as a piezo-electric buzzer and is adapted to energize the sound generator B2 for a given time in response to a "Low" level pulse signal fed from the microcomputer 1 upon attainment of an in-focus condition. A flash device 9 is provided with a light emitting portion of the illumination of the object to be photographed during the film exposure, and an auxiliary light source, e.g. composed of a near-infrared-ray emitting element IRED. As will be described later the auxiliary light source is energized to project light onto an object to be photographed under the condition of low-contrast and low-light level of the object, i.e. on condition that the object has a low contrast and at the same time low brightness. An indication element L1 is composed of an in-focus indicating LED which is energized when the objective lens is focused on the object.

An actuation switch So is closed when the user touches the shutter release button RB to bridge its electric contacts. The switch So serves as a switching means for initiating of the focusing operation by means of the microcomputer 1. A charge-over switch S1 is closed when the shutter release button RB is depressed beyond a predetermined first stroke. The change-over switch S1 is adapted to switch the automatic focusing system between a condition wherein the lens driving means is allowed to drive the objective lens driving even after an in-focus condition is detected and a condition wherein the lens driving means is inhibited from driving the objective lens once an in-focus condition is detected. A release switch S2 is closed when the shutter release button RB is depressed further beyond a predetermined second stroke.

The relationship of the shutter release button with the switches S0, S1 and S2 is now explained hereinafter with reference to FIG. 10.

On the top plane of the shutter release button is provided a pair of electric contacts x and y close to each other. The resistance between the contacts x and y is usually infinity but is lowered to, e.g. a value of the order between several hundreds ohms to several tens ohms when they are bridged by a finger of the user. A sensor S0 detecting that change of resistance, closes the actuation switch s0.

The shutter release button RB is provided with a first projection or pin RBa opposite to the change-over switch S1 and a second projection or pin opposite to the release switch S2. When the shutter release button RB is depressed beyond the first stroke, the change-over switch S1 is closed by the first projection RBa engaging the switch S1. When the shutter release button RB is depressed further beyond the second stroke, both the charge-over switch S1 and the release switch S2 are closed respectively by the first and second projections RBa and RBb engaging the switches.

Figure 2:
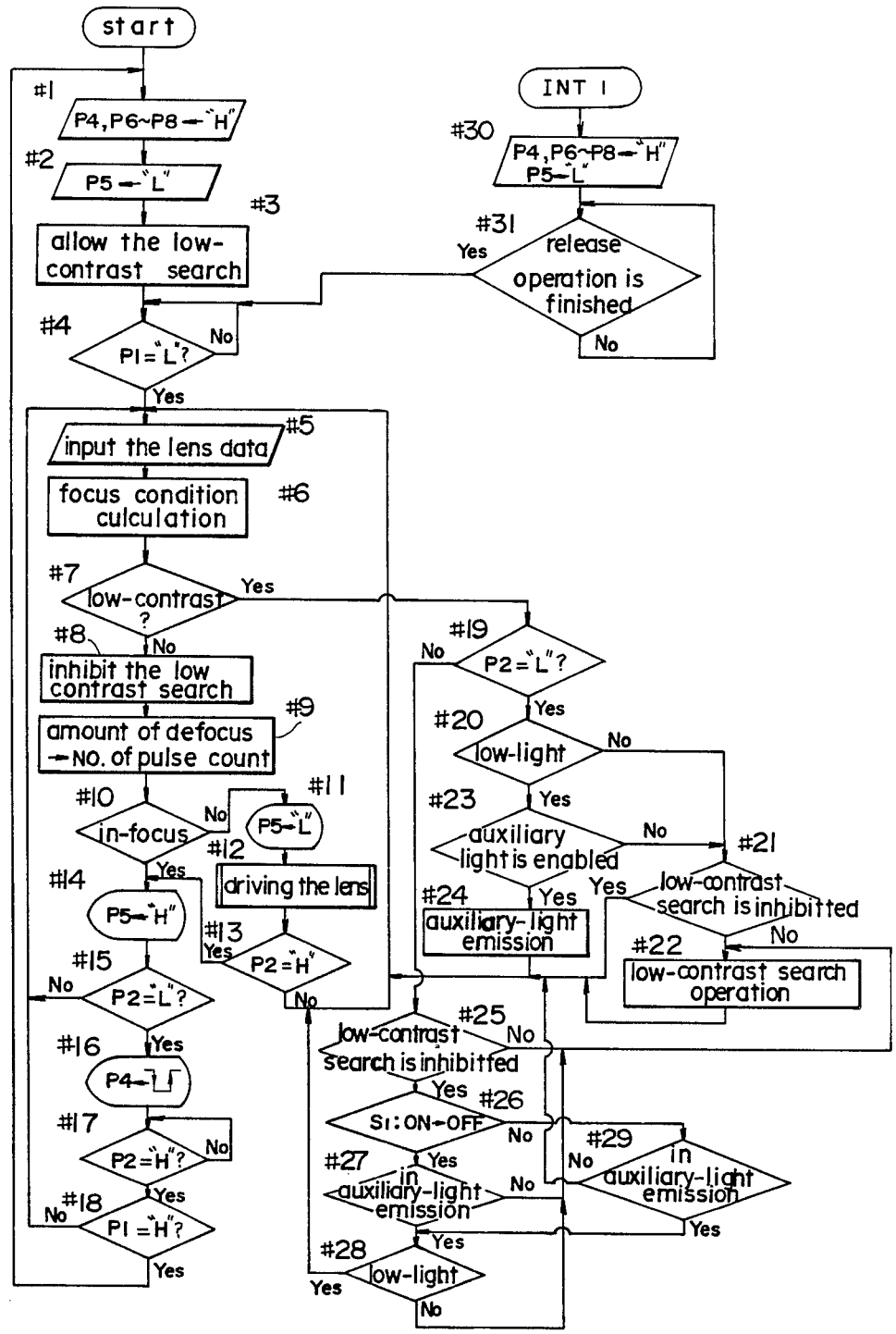
FIG. 2 is a flowchart showing the focusing operation.

Next, explanation will be made about the operation of the microcomputer 1 with reference to FIG. 2.

When a power source switch (not shown) is closed, the microcomputers 1 and 4 start their operation with the power-on reset being made. The microcomputer 1 first initializes the output ports P4 through P8 at steps #1 and #2. That is, the microcomputer 1 outputs a "High" level signal at the output port P4 to turn off the in-focus indicating buzzer BZ and also outputs "High" level signals at the output ports P6 through P8 to bring the motor M into a ceased condition. The microcomputer 1 outputs a "Low" level signal at the output port P5 to deenergize the in-focus indicating LED L1.

At step #3, low contrast searching operation is allowed. The low contrast searching operation is performed when the result of the focus detection shows a low contrast condition wherein the contrast of an object to be photographed is too low to enable focus detection with desired accuracy or the brightness of the object is too low to provide the necessary input to the CCD. In the operation, the objective lens is required to move to find a position for the objective lens to present sufficient contrast and brightness.

At step #4, the state of the actuation switch S0 is determined by the condition of the input port P1. When the actuation switch S0 has been closed with the potential at the input port P1 being a "Low" level, the operation of the microcomputer 1 proceeds to step #5. If the actuation switch S0 is open with the potential at the input port P1 being a "High" level, the operation does not proceed to the next step but repeats the operation at step #4. The microcomputer 4 starts light measurement and exposure calculation in response to the closure of the switch S0. At step #5, the microcomputer 1 reads data from the lens ROM 5 through a data bus DB2 and stores the data in the registers incorporated in the microcomputer 1. The lens ROM data includes a data of a conversion coefficient for converting an amount of defocus, e.g. the deviation of the formed image from a given focal plane, into a number of pulses to be compared with the number of pulses from the encoder. When the operation proceeds from step #5 to step #6, the light measuring operation is performed. First, a command is given to the interface 3 to initiate integration by the CCD. When the integration proceeds and a monitoring level for monitoring the integration level reaches a given value, the integration operation level reaches a given value, the integration operation is interrupted and subsequently data are transferred from the CCD to the interface 3. The interface 3 converts the analog signals sequentially input thereto, into digital signals and transfers the digital signals to the microcomputer 1 which in turn makes given calculations on the basis of the transferred signals, i.e. the signal of the data representing the brightness distribution of the object image on the CCD, thereby calculating the amount of defocus. During that calculation, the microcomputer 1 judges the low contrast.

When the low contract is determined at step #7 as the result of the calculation, the operation jumps to step #19. When the low contract is not detected, the operation proceeds to step #8.

In the case of no low contrast, the low contrast searching operation is inhibited at step #8. Accordingly, the low contrast searching will not be effected thereafter even if a low contrast condition occurs. Then, at step #9, the calculated defocus amount value is converted into a number of pulses from the encoder to be counted until an in-focus condition is attained. The data of the coefficient read at step #5 is used for the conversion. In other words, from the calculated defocus amount and the given coefficient, the microcomputer 1 determines the amount of revolutions of the motor M required for driving the objective lens to an in-focus position. At step #10, it is determined whether or not the defocus amount represented by the parameter of the number of pulses is within an allowable in-focus range. If the defocus amount is within the range, the operation jumps to step #14. If the amount is out of the range, the operation proceeds to step #11.

If the defocus amount, i.e., the number of pulses corresponding thereto is within the in-focus range, a "High" level signal is output at step #14 at the output port P5 of the microcomputer to supply base current to a transistor Tr a through a registor Rb and energize the in-focus indicating LED L1 through the transistor Tra being activated. Then, the condition of input port P2 is detected at step #15. When the potential at the port P2 is a "High" level with the change-over switch S1 being open, the operation returns to step #5 at which the focus detecting operation is started again.

When it is determined at step #15 that the potential at the input port P2 is a "Low" level with the change-over switch S1 being closed, the operation proceeds to step #16 wherein a "Low" level pulse signal is output at the output port P4. In response to the "Low" level pulse, the buzzer control circuit 8 energize the buzzer BZ for a given time. After that, the microcomputer waits at step #17 until the potential at the input port P2 becomes a "High" level. When the potential at the input port P2 turns to a "High" level with the change-over switch S1 being opened, the operation proceeds to step #18 wherein the potential at the input port P1 is detected. If the potential at the input port P1 is a "Low" level with the actuation switch S0 being closed, the operation returns to step #5 to effect the focus detecting operation again. When the switch S0 is open, the computer gets out of the above mentioned automatic focusing routine and returns to the initial condition at step #1.

As seen from the above description, the camera control device of the embodiment is arranged such that only the simple operation on the shutter release button RB will cause the switching of the focus control mode between the continuous mode wherein focus detection is made continuously causing the objective lens to follow the movement of an object to be photographed, and the one-shot mode wherein once an in-focus condition is attained during focus detecting operation, that condition is fixed and maintained, i.e. focus-locked, inhibiting the objective lens from following the object even if the condition of the latter changes. The switching between the focus control modes is effected by the charge-over switch S1 responsive to the operation of the shutter release button RB, while the focus detecting operation is initiated by the actuation switch S0.

As described above, when the users finger touches the top of the shutter release button RB, the actuation switch S0 is closed to initiate focus detecting operation, the operation at this time is always in the continuous mode. If the shutter release button RB is depressed down from the touched condition beyond the first stroke, the change-over switch S1 is closed to switch the focus detecting operation into the one-shot mode. The process from step #5 to step #15 is repeated in the case of the continuous mode, while the process from the step 5 to step #18 is repeated in the case of the one-shot code.

Accordingly, in the case of the continuous mode, the microcomputer 1 skips the operation at step #16 wherein a "Low" level pulse signal is output to the buzzer control circuit 8, so that the buzzer will not be energized continuously even if an in-focus condition continues. Whenever the buzzer BZ is energized upon attainment of an in-focus condition, the focus control system is in the one-shot mode and the buzzer notifies the user of the focus locked condition.

Then, explanation is made about the case wherein the defocus amount representing pulse number is determined as being out of the in-focus range and operation proceeds to step #11.

At step #14, a "Low" level signal is output at the output port P5 to deenergize the in-focus indicating LED L1 and the objective lens is driven and controlled at step #12 as described later. At the step #12, the lens is driven by an amount commensurate with the defocus amount representing the pulse number. After the objective lens has been driven, the condition of the switch S1 is determined at step #13 by the potential at the input port P2. When the switch S1 is closed with the potential at the input port P2 being a "Low" level representing the one-shot mode, the operation returns to the step #5 for effecting the focus detection again. In contrast, when the switch S1 is open with the potential at the input port P2 at a "High" level representing the continuous mode, the lens driven condition is determined as an in-focus condition and the operation proceeds to step #14.

The operation of the computer is led to different flows in dependence upon the condition of the change-over switch S1 as described above. This is for the following reason. In the case of the continuous mode, the operation may be advanced to the next stage with the decision as attainment of an in-focus condition even if some error remains in the lens position, because the objective lens follows the movement of the object thereafter. In the case of the one-shot mode, the accuracy of determined focusing is more important and the in-focus condition is not decided and no output signal is generated for the energization of the buzzer BZ and the LED L1 until the focusing is detected again and it is determined again at step #10 that the in-focus condition has been attained.

Then, explanation will be made about the case wherein low contrast in determined at step #7 and the operation jumps to step #19.

At step #19, the condition of the change-over switch S1 is determined by the potential at the input port P2. When the change over switch is open with the automatic focusing system being in the continuous mode, the operation jumps to step #25. When the change-over switch S1 is closed with the system being in the one-shot mode, the operation proceeds to step #20.

In the case of the one-shot mode, whether the object is in low light condition or not is determined at step #20. When the object is in low light condition, the operation jumps to step #23. When the object is not in a low light condition, the operation proceeds to step #21. The low light condition means a condition wherein the brightness of the object to be be photographed is so low that the integration by the CCD2 can not reach, within a given time, a level sufficient for the focus detection. When the operation jumps to the step #23 with a low light condition being detected, it is detected whether the auxiliary light source has become ready for auxiliary light emission for the focus detection. The condition of the auxiliary light is determined by the level of the output signal ALOCK output from the flash device 9 connected to the input port P15. The output signal ALOCK turns from a "High" level to a "Low" level for example when the flash device 9 is coupled with the camera and its actuation switch (not shown) is closed.

If the auxiliary light source is available by the determination at step #23, the operation proceeds to step #24 wherein auxiliary light of near infrared is emitted with a "Low" level signal being output at the output port P14. In response to the "Low" level signal, the auxiliary light source such as the near infrared light emitting element IRED provided in the flash device 9 is energized. After the emission of the auxiliary light is initiated the operation returns to step #5 to perform the focus detecting operation. The auxiliary light emission is to be maintained until the integration by the CCD2 terminates. A filter with a plurality of slits is disposed in front of the auxiliary light source such that contrast of some degree will be produced on the object with the auxiliary light projected onto the object to enable focus detection even if the object has low contrast.

In the cases when it is determined at step #20 that the object is not in a low light condition, and when it is determined at step #23 that the auxiliary light source has not become ready for light emission, the operation proceeds to step #21 wherein it is determined whether the low contrast searching operation has been inhibited or allowed. If the low contrast search has been inhibited, the operation returns to step #5 for performing a focus detecting operation again. If the low contrast search has been allowed, the operation proceeds to step #22 wherein the low contrast search operation is executed. The low contrast search operation is executed. The low contrast search operation is effected in the cases when low contrast condition is detected during the first focus detecting operation after closure of the actuation switch S0 in ordinary operation, and when low contrast condition is detected during the first focus detecting operation after the change-over switch S1 is switched from the closing to the opening state with only the actuation switch S0 being closed.

Thus, the low contrast search is not effected in such a case when low contrast is detected because the target object moves off the aiming, i.e. the focus detecting area during the focus detection due to shaking of camera or movement of the target object. If the low contrast searching operation is effected in such a case, it is likely to occur that the objective lens near an in-focus position is moved away therefrom. Accordingly, the low contrast searching operation is inhibited in such cases.

In the low contrast searching operation at step #22, focusing condition is detected with the objective lens being driven. The objective lens is stopped when it reaches a position where low contrast does not occur. Then, the operation returns to step #5 for normal focus detecting operation. The low contrast search is performed with the objective lens being driven to reach its nearmost focusing end and also its infinity focusing and for one time on each movement. If the low contrast condition remains even after the objective lens reached both ends by one time each, the focus detection is continued with the objective lens being stopped and the low contrast reaching operation being inhibited.

In the case when it is determined at step #19 that the potential at the input port P2 is a "High" level with the automatic focusing system being in the continuous mode, the operation jumps to step #25 wherein it is determined whether the low contrast searching operation has been inhibited. If the low contrast searching operation has not been inhibited, the operation is effected as described above.

If the low contrast searching operation has been inhibited, it is then determined at step #26 whether the focus detecting operation being effected is the operation immediately after the turning of the change-over switch S1 from a closing to an open condition. In the case of the focus detecting operation immediately after the switching of the change-over switch S1 from the closure to opening, i.e. immediately after the switching from the one-shot mode to the continuous mode, the operation proceeds to the next step #27 wherein it is determined whether the automatic focusing system was in the auxiliary light assisted focus detecting operation just before the switching of the mode. If the system is not in the auxiliary light operation and is switched to the continuous mode, the operation jumps to step #22 for the low contrast searching operation. If the system entered the auxiliary light operation just before the switching to the continuous mode, the operation proceeds to step #28 to check low light condition.

In the case it is determined at step #26 that the focus detecting operation is not the operation immediately after the switch from the one-shot mode to the continuous mode, the operation jumps to step #29 wherein it is determined whether the system entered the auxiliary light operation at the time of the one shot mode. If the system did not enter the auxiliary light operation, the operation returns to step #5 to continue the focus detecting operation. If the system entered the auxiliary light operation, the operation proceeds to step #28 wherein low light condition or is not checked. If the low light condition is detected, the operation returns to step #5 to continue to the focus detecting operation while waiting for the time when the low contrast or low light condition is dissolved. If it is determined at step #28 that the object is not in the low light condition, the operation jumps back to step #22 for the low contrast searching operation.

Thus, even if the operation of the automatic focusing system is switched from the one shot mode to the continuous mode with the object image being in the low contrast condition, the low contrast searching operation is not effected immediately in the case the system entered the auxiliary light operation in the one shot mode. The low contrast searching operation is effected when the low light condition is dissolved.

Then, explanation will be made with reference to FIG. 1 about the operation at the time when the shutter release button is depressed further beyond the second stroke to close the release switch S2.

At that time, the actuation switch S0 and the change-over switch S1 are both closed so that the microcomputer 4 performs light measurement and exposure calculation. When the closure of the release switch S2 is detected by the dropping of the potential at the input port PC from a "High" to a "Low" level, the camera shutter is released to make exposure on the basis of the calculated exposure parameters. The release switch S2 is also connected with the input port P3 of the microcomputer AFC, the input port P3 serving an an interruption terminal. When the release switch S2 is closed to make the potential at the input port P3 from a "High" to a "Low" level, an interruption occurs and the operation starts at step 30.

At step #30, the output ports are initialized to stop the motor and deenergize the in-focus indicating buzzer BZ and LED L1. Then the microcomputer waits for termination of the exposure operation. Upon termination of the exposure operation, the microcomputer gets out of the interruption routine and returns to step E4 wherein the normal operation is performed.

Figure 3B:
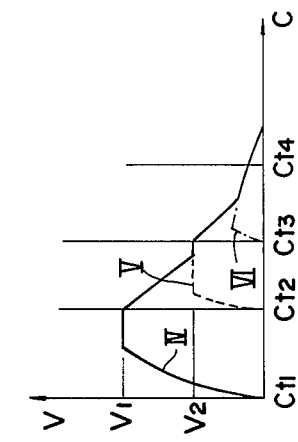
FIGS. 3(a) and (b) are diagrams showing how the speed of the motor for lens driving is controlled.

Next, the lens drive control will be described. FIGS. 3(a) and 3(b) are diagrams showing the manner of controlling the revolutional speed of the driving motor M at the time when the objective lens is being shifted. With reference to the diagram of FIG. (3d), the curved lines show the relationship between the speed of the motor M and the number of pulses to be counted until the objective lens reaches an in-focus position, i.e. the defocus amount corresponding pulse number, with the parameter of torque load for the motor during the driving of the objective lens. The broken line I shows the case where the torque load for driving the objective lens is small. The chain-dot line III show the case where the torque load for driving the objective lens is large. The solid line shows the case where the torque load for driving the objective lens is intermediate between the torque load of the above two cases.

The magnitude of the torque load depends on the weight of the lenses composing the objective lens system, the viscosity of the grease in the lens driving system and other factors related to the lens driving mechanism. All the data related to such factors are stored in the lens ROM 5. When the microcomputer 1 controls the revolutional speed of the motor M, the speed and the defocus amount corresponding pulse number shows the characteristics as shown in the diagram.

When the rest C of the pulse number to be counted for the objective lens to be driven to an in-focus position is larger than a given value Ct1, the power is continuously supplied to the motor to drive the latter with full power such that the objective lens is driven as fast as possible. When the rest C of the pulse number reaches the given value deceleration of the motor begins to stop the motor M smoothly and precisely. Until the rest C of the pulse number reaches a second given value Ct2, the revolutional speed v of the motor M is regulated at a speed V1.

Figure 3:
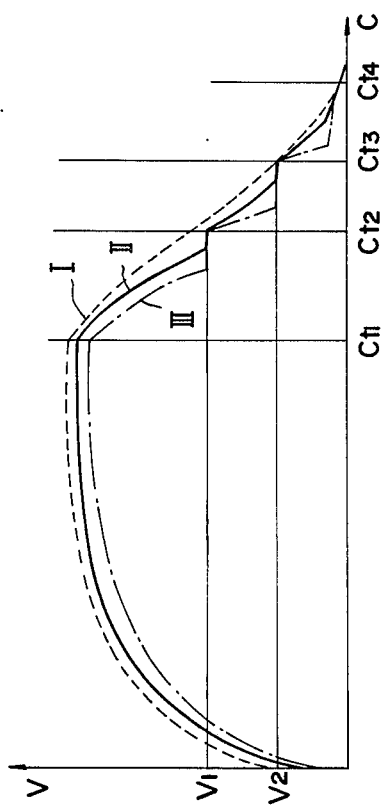

In the case when the torque load for driving the objective lens is relatively small, the deceleration is continued as shown by the curve I in FIG. 3 even after the rest C of the defocus amount corresponding pulse number reaches the given value Ct2 because the revolutional speed of the motor M will not decrease to a given value V1 until the rest C of the defocus amount corresponding pulse number reaches the given value. When the torque load for driving the objective lens is large, the revolutional speed of the motor M will be smaller than the given value V1, as shown by the curves II and III in FIG. 3, before the rest C of the defocus amount corresponding pulse number reaches the given value V1 and the revolutional speed is maintained at the speed V1 thereafter.

When the rest of the defocus amount corresponding pulse number reaches a given value Ct2, the revolutional speed of the motor M is regulated at a speed V2. The revolutional speed V2 and the given value Ct2 are determined to such values that even in the case of the objective lens with the small driving torque load, the revolutional speed V of the motor M decreases to the given value V2 before the rest C of the defocus amount corresponding pulse amount reaches the given value Ct3.

When the revolutional speed V of the motor M is smaller than the given value V2, the driving force of the motor M is too large to be regulated at a desired speed and the value of the speed of the motor M scatters largely so that it is difficult to stop the motor M precisely. Therefore, the motor M is controlled in that speed range by short time emergizing method.

There are two kinds of the short time energizing method. The one is a method wherein the motor M is energized for a given time (hereinafter referred to as a first type short-time energizing mode). The second is a method wherein the energization of the motor M is stopped when the rising of a pulse from the encoder occurs during the energization due to the revolution of the motor M (hereinafter referred to as the second type short time energization mode).

The latter method is employed for the last several pulses just before the stoppage of the motor M because the second method greatly decelerates the moving speed of the objective lens although the second method is much effective to stop the motor M precisely. The first method is applied for the lens driving during the transitional time between the constant speed driving and the second method driving. The first method may provide the motor stopping preciseness within the amount controlled by several pulses by the second method and is helpful to provide a little larger lens driving speed. In both methods, when the revolutional speed V of the motor M reaches a given low value the motor M is energized again such that the revolutional speed of the motor M will not be high.

The diagram of the FIG. 3(b) shows the manner of controlling the revolutional speed of the motor M in the case where the objective lens is driven by a small amount for the focusing.

The lens driving speed is controlled as shown by the solid line IV in the case when the lens driving is started in the control range from Ct1 to Ct2 for the given speed V1, as shown by the broken line V in the case when the lens driving is started in the control range from Ct2 to C3 for the given speed V2, and as shown by the chain-dot line IV in the case when the lens driving is started in the short-time motor energization control range. Thus, even in the case where the objective lens is to be driven by lens amount for focusing, the lens driving speed is increased to some degree and then lowered with the speed being adjusted at the final stage so that the objective lens is shifted quickly to an exact position with high preciseness.

Figure 4:
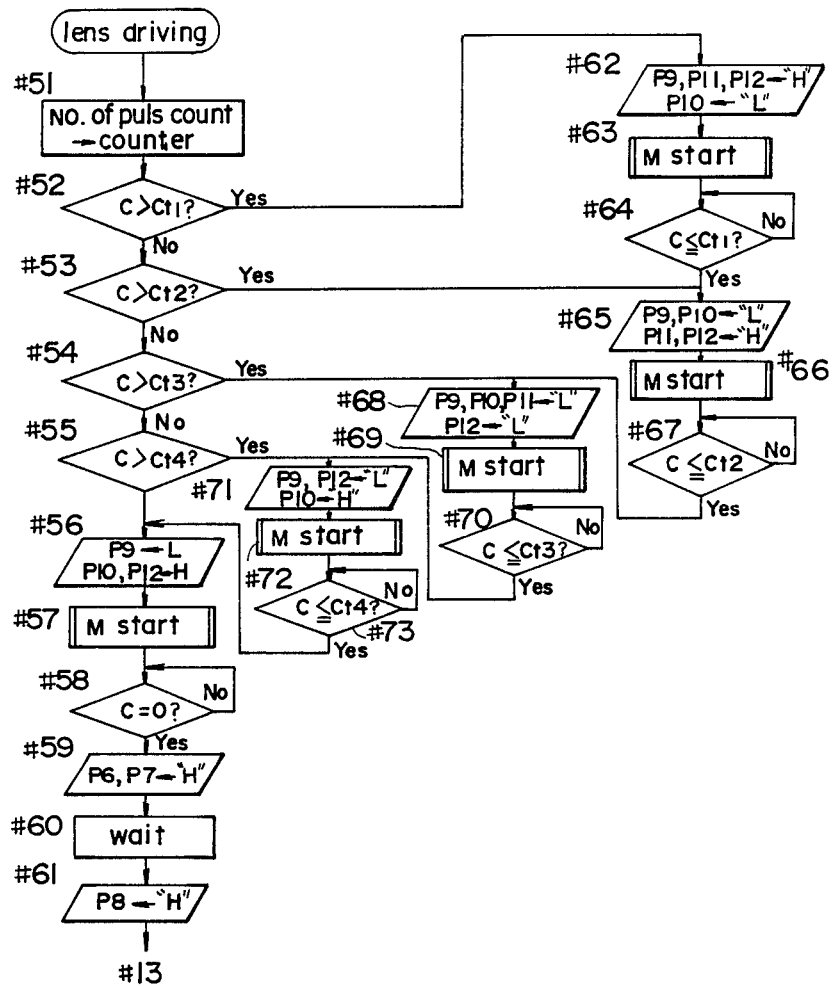
FIG. 4 is a flowchart showing the lens driving control operation.
Figure 5:
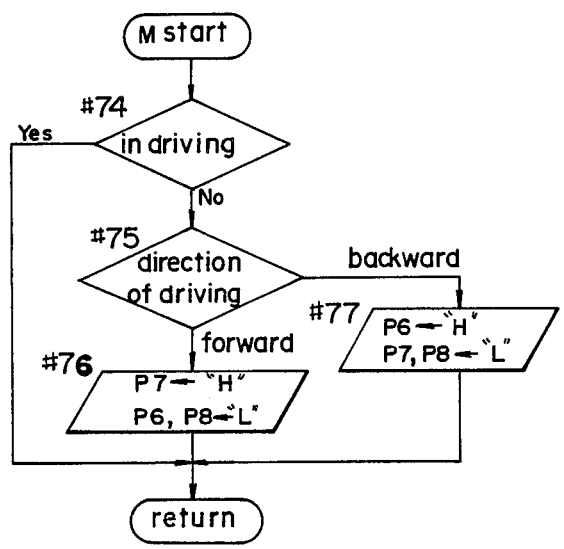
FIG. 5 is a flowchart showing motor actuating operation.

The operation of the microcomputer 1 for the control of the objective lens driving is described hereinafter with reference to the flowchart in FIGS. 4 and 5.

At step #51, the microcomputer 1 stores the calculated defocus amount corresponding pulse number value in a down-counter included in the microcomputer 1. The down-counter is arranged such that the stored value is decremented by one each time when the input signal to the input port P13 of the microcomputer 1 rises from a "Low" level to a "High" level. As shown in FIG. 1, the signal ENCP from the encoder 7 is input to the input port P13 of the microcomputer 1 and the down-counter in the microcomputer counts the number of pulses produced by the encoder 7.

At step #52, it is determined whether or not the down-counted or decremented pulse number value is larger than a given value Ct1. When the down-counted pulse number value is larger than the given value Ct1, the operation jumps to step #62 wherein "High" level signals are output at the output ports P9, P11 and P12 and a "Low" level signal is output at the output port P10 to drive the motor M with continuous power supply. The output signal from the output port P9 through P12 are applied to the motor drive control circuit 6 which is set by those signals to drive the motor M with the power being supplied continuously to the motor M. Then, the microcomputer calls at step #63 a sub-routine "MSTART" which starts at step #74 shown in FIG. 5. At step #74, it is determined whether the motor M is being driven or not. If the motor M is being driven, the operation returns to the main routine without doing anything. When the motor M has been stopped, the operation proceeds to step #75 to determine what direction the objective lens is to be moved. If the motor M is to be driven in the direction to move the lens forward, a "High" level signal is output at the output port P7 ($\overline{MR}$) and "Low" level signals are output at the output ports P6 ($\overline{MF}$) and P8 ($\overline{MB}$) to actuate the motor drive control circuit 6 and drives the objective lens forward as will be described later. If the motor M is to be driven in the direction to move the lens backward, a "High" level signal is output at the output port P6 ($\overline{MF}$) and "Low" level signals are output at the output ports P7 ($\overline{MR}$) and P8 ($\overline{MB}$) to drive the objective lens backward. After those operations have been performed, the operation of the microcomputer 1 returns to the main routine.

After returning to the main routine, the operation proceeds to step #64 wherein the continuous power supply to the motor M is continued until the rest of the defocus amount corresponding pulse number i.e. the counted-down pulse number value reaches the given value, whereupon the operation proceeds to step #65.

When the counted-down defocus amount corresponding pulse number value C is less than the given value Ct1 at the step #52, the operation proceeds to step #53 wherein it is determined whether or not the counted-down defocus amount corresponding pulse number value C is larger than the second given value Ct2 (Ct2<Ct1). If the pulse number value C is larger than the second given value Ct2, the operation proceeds to step #65.

At step #65, "Low" level signals are output at the output ports P9 and P10 and "High" level signals are output at the output ports P11 and P12 to regulate the revolutional speed V of the motor at V1. In response to those signals, the motor drive control circuit 6 is set to drive the motor M at the speed V1. At step #66, the subroutine "MSTART" is called again to perform the process as described above. Then, the operation returns to the main routine and proceeds to step #67 wherein the motor drive control circuit 6 drives the motor at the rate V1 until the rest C of the defocus amount corresponding pulse number value reaches the second given value Ct2 whereupon the operation proceeds to step #68.

When the rest C of the defocus amount corresponding pulse number value is smaller than the second given value Ct2 at the step #53, the operation proceeds to step #54 wherein it is determined whether or not the rest C of the defocus amount corresponding pulse number value is larger than the third given value Ct3 (Ct3<Ct2). If the rest C of the pulse number value is larger than the third given value, the operation also jumps to the step #68.

At step #68, "Low" level signals are output at the output ports P9, P10 and P11 and a "High" level signal is output at the output port P12 to regulate the revolutional speed of the motor M at a given speed V2 (V1>V2). In response to those signals, the motor drive control circuit 6 is set to drive the motor M at the speed V2. Then, the operation proceeds to step #69 to call and perform the subroutine MSTART. Returning from the sub-routine, the operation proceeds to step #70 wherein the motor drive control circuit 6 continues to drive the motor M at the speed V2 until the rest C of the defocus amount corresponding pulse number value reaches the third given value Ct3 whereupon the operation proceeds to step #71.

If the rest C of the defocus amount corresponding pulse number value is smaller than the third given value Ct3 at the step #54, the operation proceeds to step #55 wherein it is determined whether or not the rest C of the defocus amount corresponding pulse number value is larger than the fourth given value Ct4 (Ct4<Ct3). When the rest C of the pulse number value is larger than the fourth given value Ct4, the operation jumps to step #71.

At step 71, "Low" level signal are output at the output ports P9 and P12 and "High" level signal are output at the output at the output port P10 such that the motor drive control circuit 6 is set to drive the motor M in the first type short time energization mode. Then, the operation proceeds to step #72 to call and perform the subroutine MSTART In the same manner as described above. Returning to the main routine, the operation proceeds to step #73 wherein the motor drive control circuit 6 drives the motor M in the first type short time energization mode until the rest C of the defocus amount corresponding pulse number value reaches the fourth given value Ct4 whereupon the operation returns to step #56.

When the rest C of the defocus amount corresponding pulse number value is smaller than the fourth given value at step #55, the operation also proceeds to step #56.

At step #56, a "Low" level signal is output at the output port P9 and "High" level signals are output at the output terminals P10 and P12. In response to those signals, the motor drive control circuit 6 is set to drive the motor M in the second type short time motor driving mode. Then, the operation proceeds to step #57 wherein the subroutine MSTART is called and performed. After that, the operation returns to the main routine and proceeds to the step #58 wherein the motor M is drive in the second type short-time energization mode until the rest of the defocus amount corresponding pulse number value reaches zero to terminate the counting of the pulse number.

After the count number is terminated, the operation proceeds to step #59 wherein "High" level signals are output at the output ports P6 ($\overline{MF}$) and P7 ($\overline{MR}$) to deenergize the motor M. At that time, the potential at the output port P8 ($\overline{MB}$) remains at a "Low" level to brake the motor M. After waiting at step #60 until the motor M stops completely, the operation proceeds to step #61 wherein a "High" level signal is output at the output port P8 ($\overline{MB}$) to release the braking of the motor. Thus, the lens driving is completed.

Figure 6:
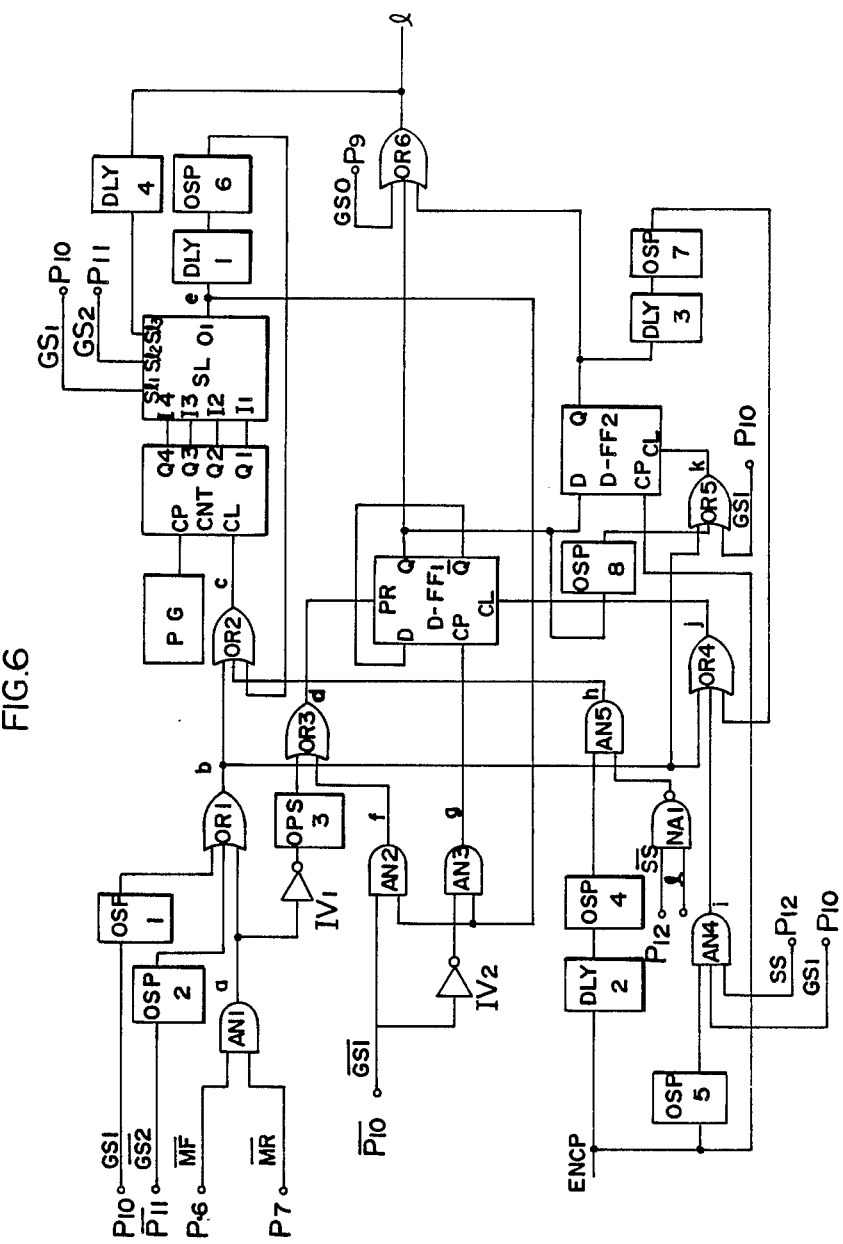
FIG. 6 is a block diagram of a motor drive control circuit.

Then, the construction and operation of the motor drive control circuit 6 with reference to FIG. 6 wherein the reference characters AN1 through AN5 respectively denote AND gates, OR1 through OR7 denote OR gates, NA1 through NA3 denote NAND gates, IV1 and IV2 denote inverters and DLY1 through DLY4 denote delay circuits. One-shot pulse generators OSPI through OSP2 output a "High" level pulse of a short time duration in response to the rising of their input signal from a "Low" to a "High" level. D-flip-flop D-FF1 and D-FF2 are provided in the circuit. A standard pulse generator PG is connected at its output terminal to the clock input terminal CP of a counter CNT. In accordance with the selection signals SL1, SL2 and SL3, a signal selector circuit SL selects one of the input terminals I1 through I4 to which signals are supplied respectively from the output terminals Q1 through Q4 of the counter CNT. The signal selector circuit S1 outputs at the output terminal O1 the signal fed to the selected input terminal.

Figure 7:
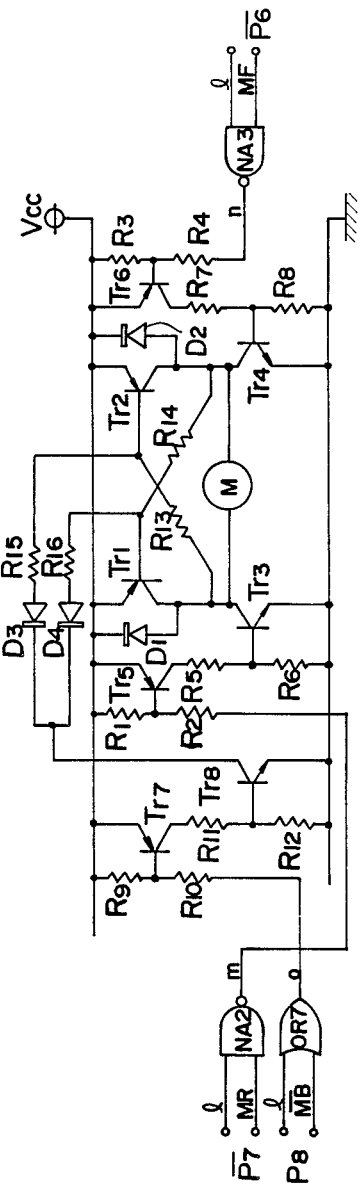
FIG. 7 is a circuit diagram of the motor drive section.

FIG. 7 shows the construction of the motor driving section. First, let's see the case when "High" level signals are output at the output m of a NAND gate NA2, the output n of a NAND gate NA3 and the output 0 of an OR gate ΘR7. The "High" level of the output m makes a transistor Tr5 non-conductive to make a transistor Tr3 also non-conductive. The "High" level of the output n makes a transistor Tr6 non-conductive to make a transistor Tr4 non-conductive. Further, the "High" level of the output 0 of the OR gate OR7 makes a transistor Tr7 non-conductive to make a transistor Tr8 non-conductive. As the transistors Tr3 and Tr4 are non-conductive, transistors Tr1 and Tr2 are not supplied with base current and are non-conductive so that the motor M remains stopped with no electric current supplied thereto.

When only the output m of the NAND gate NA2 becomes a "Low" level, the transistor Tr5 is made conductive to make the transistor Tr3 conductive. As the result, base current is supplied through a resistor R13 to the transistor Tr2 to make the transistor Tr2 conductive so that the motor M is energized and begins to turn. The rotation of the motor M is transmitted through a transmission mechanism (not shown) to a lens driving mechanism (not shown) to drive the objective lens backward.

When only the output n of the NAND gate NA3 becomes a "Low" level, the transistor Tr6 is made conductive to make the transistor Tr4 conductive so that base current is supplied through a resistor R14 to the transistor Tr1 to make the transistor Tr1 conductive. As the result, the motor M is supplied with current in the opposite direction from that mentioned above and begins to turn in the opposite direction. The rotation of the motor M is transmitted through the transmission mechanism to the lens driving mechanism to drive the objective lens forward.

When only the output o of the OR gate OR7 becomes a "Low" level, the transistor Tr7 is made conductive to make the transistor Tr8 conductive so that base current is supplied to the transistor Tr2 through a diode D3 and a resistor R15 and to the transistor Tr1 through a diode D4 and a resistor R16, thereby making both transistor Tr1 and Tr2 conductive. As the result, the both end terminals of the motor M are short-circuited to the power source terminal Vcc through the transistor Tr1 and the diode D2 or the transistor Tr2 and the diode D1 so that the motor M is braked.

Then, explanation is made about the operation of the motor drive control circuit 6 shown in FIG. 6.

When the motor M is driven with continuous power supply, the output signal GSO from the output port P9 of the microcomputer 1 is a "High" level to make the output 1 of the OR gate OR6 a "High" level. The output terminal of the OR gate OR6 is connected to respective one of input terminals of the NAND gates NA2 and NA3 and the OR gate OR7. The "High" level output of the OR gate OR6 make the output 0 of the OR gate OR7 a "High" level so that the motor M is not braked. The output signals $\overline{MR}$ and $\overline{MF}$ from the output ports P7 and P6 of the microcomputer 1 differ with the direction in which the motor M is to be driven. When the motor M is to be driven to move the objective lens forward, the output signal $\overline{MF}$ is made a "Low" level. When the motor M is to be driven to move the objective lens backward, the output signal $\overline{MR}$ is made a "Low" level.

When either one of the output signals $\overline{MR}$ and $\overline{MF}$ becomes a "Low" level, one of the outputs m and n of the NAND gate NA2 and NA3 is made a "Low" level to effect the continuous power supply to the motor M.

Figure 8:
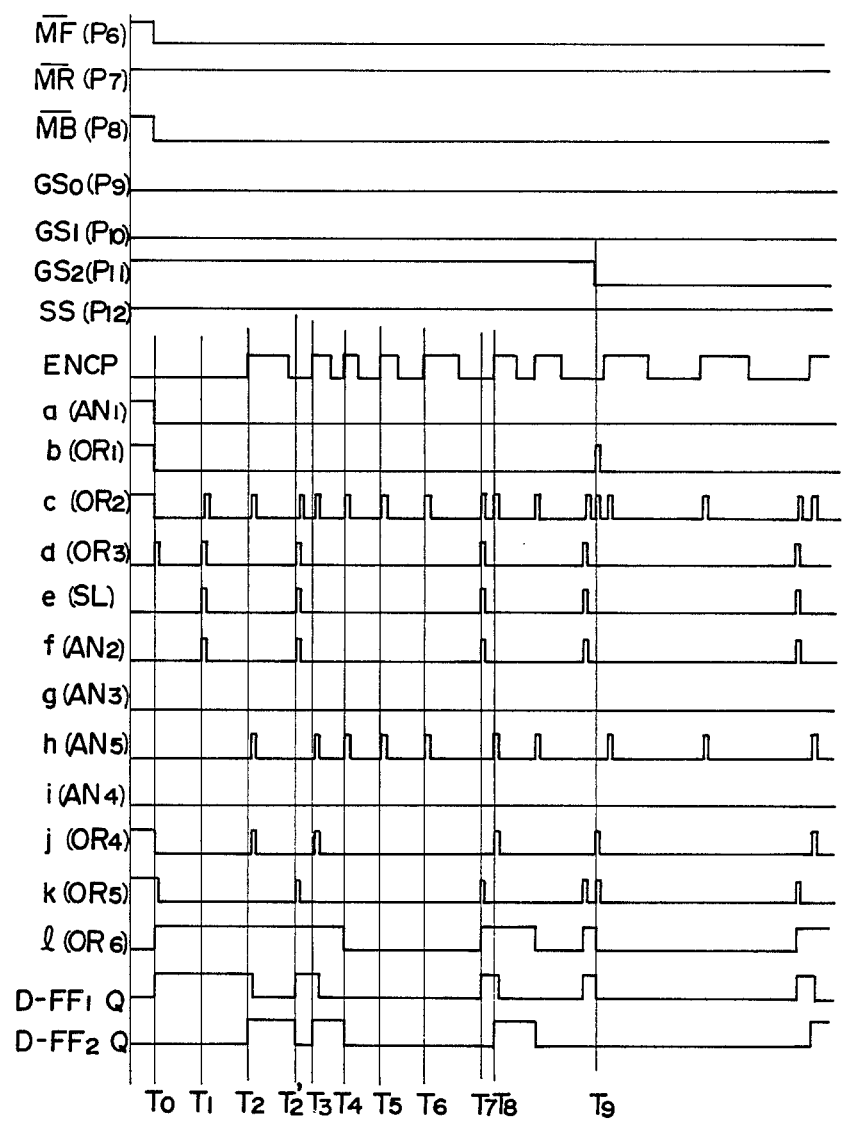
FIGS. 8 and 9 are time-charts of the motor speed control operation.

Next, explanation will be made, with reference to the time chart in FIG. 8, about the operation to control the motor M at a constant speed. It is to be noted that the time chart in FIG. 8 shows the case wherein "Low" level signals are output at the output ports P6 and P8 to drive the motor M in the direction to move the objective lens forward, and that the following explanation will be made for that case.

For the constant speed motor driving control, the output signals of the microcomputer 1 assume following states: the output signal GSO from the output port P9 and the output signal GS1 from the output port P10 are respectively "Low" levels, while the output signal SS from the output port P12 is a "High" level. The output signal GS2 from the output port P11 is a "High" level when the motor M is to be driven at the high speed V1. As the output signal GS1 is a "Low" level, both outputs i and g of the AND gates AN4 and AN3 are "Low" levels. Additionally, the "High" level of the output signal SS makes the output of the NAND gate NA1 a "High" level.

The signal selector circuit SL is arranged to select the input terminal I1 when the signal Sl1 (GS1) as a selection signal is a "Low" level and the signal Sl2 (GS2) is a "High" level. The input terminal I1 is connected to the output terminal Q1 of the counter CNT and the output signal from the terminal Q1 is output at the output terminal Q1 of the signal selector terminal SL. The counter CNT counts the output pulses from the standard pulse generator PG and makes the potential at the output terminals Q1 through Q4 "High" levels in accordance with the counted number. The period from the commencement of the pulse counting to the time when the potential at the output Q1 becomes a "High" level is determined to be equal to the period of the pulse signals ENCP fed from the encoder circuit ENCP (the pulse signals being referred to as encoder pulses hereinafter) when the motor M is driven at the given speed V1.

Explanation is first made about the operation to control the speed of the motor M at the high speed V1.

Under the condition as described above, when the signal $\overline{MF}$ output from the output terminal P6 of the microcomputer 1 for driving the motor M in the direction to move the objective lens forward, becomes a "Low" level at a time To, the output a of the AND gate AN1 becomes a "Low" level to make the output b of the OR gate OR1 a "Low" level. Accordingly, the output c of the OR gate OR2 is made a "Low" level to cancel the clearing condition of the counter CNT which in turn begins counting. The "Low" level of the output b of the OR gate OR1 makes the output j of the OR gate OR4 a "Low" level to cancel the clearing condition of the flip-flop D-FF1. The "Low" level of the output b also makes the output k of the OR gate OR 5 a "Low" level to cancel the clearing condition of the flip-flop D-FF2.

The invention of the output a of the AND gate AN1 to a "Low" level, the output of the inventer IV1 turns from a "Low" to a "High" level so that a short pulse of a "High" level is output from the one-shot pulse, generator circuit OSP3. In response to the one shot pulse, the output d of the OR gate OR3 becomes a "H" level in the form of a pulse and the output d is applied to the preset input terminal PR of the flip-flop D-FF1, so that the output of the flip-flop D-FF1 becomes a "High" level to make the output l of the OR gate OR6. As the signal $\overline{MF}$ from the output terminal P6 is a "Low" level, the inverted signal MF of the signal $\overline{MF}$ is a "High" level. Accordingly, the output n of the NAND gate NA3 shown in FIG. 7 is a "Low" level to effect power supply to the motor M which rotates in the direction to drive the objective lens forward.

While the speed of the motor M in low after the commencement of the motor rotation, the potential at the output terminal Q1 of the counter CNT becomes a "High" level is a shorter time than the period of the encoder pulses ENCP. As shown in FIG. 8, when the potential at the output terminal Q1 of the counter CNT becomes a "High" level at the time T1, the output e of the signal selector circuit SL is made a "High" level which makes the output f of the AND gate AN2 and the output d of the OR gate respectively High levels. Accordingly, the flip-flop D-FF1 remains in the preset state with the potential at the output terminal Q remaining at a "High" level and the output l of the OR gate OR6 being a "High" level so that the power supply to the motor M is continued. The output e of the signal selector circuit SL is applied through the delay circuit DLY1 to the one shot pulse generator circuit OSP6 which outputs a "High" level short pulse in synchronization with the rising of the output e. The short pulse signal is applied through the OR gate OR2 to the clear input terminal CL of the counter CNT so that the latter begins a counting operation again.

When the encoder pulse ENCP rises at the time T2, the flip-flop D-FF2 latches, in synchronization with the rising of the encoder pulse ENCP, the input signal to its input terminal D, i.e. the output signal from the output terminal Q of the flip-flop D-FF1 and outputs the latched signal at the output terminal Q of the flip-flop D-FF2. As the output signal from the output terminal of the flip-flop D-FF1 is a "High" level, the flip-flop D-FF2 outputs at its output terminal Q a "High" level signal so that the output l of the OR gate OR6 is maintained at a "High" level and the power supply to the motor M is continued. When the potential at the output terminal Q of the flip-flop D-FF2 becomes a "High" level, a "High" level signal is applied through the delay circuit DLY3 to the one shot pulse generator circuit OSP7 which outputs a "High" level short pulse. The short pulse is applied through the OR gate OR4 to the clear input terminal CL of the flip-flop D-FF1 which is cleared and outputs a "Low" level signal at its output terminal Q.

In response to the rising of the encoder pulse ENCP, a "High" level signal is applied through the delay circuit DLY2 to the one shot pulse generator circuit OSP4 which outputs a "High" level short pulse. As the output signal SS from the output pot P12 is a "High" level and the NAND gate NA1 to which the signal $\overline{SS}$ inverted from the signal SS is applied, outputs a "High" level signal, the output h of the AND gate AN5 becomes a "High" level in the form of a pulse. The output h is applied through the OR gate OR2 to the clear input terminal CL of the counter CNT so that the potentials at all the output terminals Q1 through Q4 of the counter CNT become "Low" levels and the counter CNT again begins the counting from zero.

When the potential at the output terminal Q1 of the counter CNT becomes a "High" level at the time T2' before the next rising of the encoder pulse ENCP, the revolutional speed v of the motor M is still lower than the given value v1. At this time, as the output e of the signal selector circuit SL is a "High" level as mentioned before, the output f of the AND gate AN2 is a "High" level. The output d of the OR gate OR3 is also a "High" level so that the flip-flop D-FF1 is preset to output a "High" level at its output terminal Q. The output l of the OR gate OR6 is maintained at a "High" level to continue the power supply to the motor M. In response to the rising of the output signal from the output terminal Q of the flip-flop D-FF1, the one-shot pulse generator OSP8 outputs a "High" level short pulse signal, which is applied through the OR gate OR5 to the clear input terminal CL of the flip-flop FF2 to clear the latter so that the potential at the output terminal of the flip-flop D-FF2 becomes a "Low" level.

When the output e of the signal selector circuit SL becomes a "High" level, a "High" level signal is applied through the delay circuit DLY1 to the one shot pulse generator OSP6 which outputs a "High" level short pulse. The short pulse is applied through the OR gate OR2 to the clear input terminal CL of the counter CNT so that the potentials at all the output terminals Q1 through Q4 of the counter CNT become "Low" levels. As the result of the "Low" levels at all the output terminals Q1 through Q4 of the counter CNT become "Low" levels. As the result of the "Low" levels at all the output terminals Q1 through Q4 of the counter CNT, the output e of the signal selector circuit SL will be a "Low" level to make the output f of the AND gate AN2 a "Low" level and accordingly the output d of the OR gate OR3 a "Low" level.

When the rising of the encoder pulse ENCP occurs at the time T3 after the above mentioned "Low" level restoration, the same operation as that responsive to the rising of the encoder pulse ENCP at the time T2 will be performed.

When the encoder pulse ENCP rises at the time T4 before the potential at the output terinal Q1 of the counter CNT becomes a "High" leve, the revolutional speed v of the motor M is higher than the given value v1. In response to the rising of the encoder pulse ENCP, the flip-flop D-FF2 latches the "Low" level output at the output terminal Q of the flip-flop D-FF1 and outputs a "Low" level signal at the output terminal of the flip-flop D-FF2. In response to the "Low" level output, the output 1 of the OR gate OR6 becomes a "Low" level and the output n of the NAND gate NA3 which has been maintained at a "Low" level, turn to a "High" level to interrupt the power supply to the motor M. At the same, as the output signal $\overline{MB}$ from the output terminal P8 is a "Low" p level, the output o of the OR gate OR7 becomes a "Low" level to brake the motor M.

In response to the rising of the encoder pulse ENCP, a "High" level signal is applied through the delay circuit DLY2 to the one shot pulse generator OSP4 which outputs a "High" level short pulse. As the output of the NAND gate AN1 is a "High" level, a "High" level pulse signal is applied through the AND gate AN5 and the OR gate OR2 to the clear input terminal CL of the counter CNT to clear the outputs at all the output terminal Q1 through Q4 of the counter CNT in the same manner as described before.

After that, the above described operation are repeated to regulate the revolutional speed v of the motor M at the value v1. The operation in response to the rising of the encoder pulse ENCP at the time T5 and T6 shown in FIG. 8, is the same as the operation in response to the rising of the encoder pulse ENCP at the time T4. The operation in response to the rising of the potential at the output terminal Q1 of the counter CNT at the time T7 is the same as the operation in response to the rising of the potential at the output terminal Q1 of the counter CNT at the time T1. The operation in response to the rising of the encoder pulse ENCP at the time T8 is the same as that at the time T2.

Subsequently, explanation will be made about the operation to regulate the revolutional speed of the motor M at the low-speed v2.

When the output signal GS2 from the output port P11 of the microcomputer 1 is made a "Low" level at the time T9 in order to change the regulated speed of the motor M, the signal $\overline{GS2}$ inverted from the output signal GS2 is applied to the one shot pulse generator OSP2 which outputs a "High" level short pulse.

The short pulse makes the output b of the OR gate OR1 a "High" level in the form of a pulse and the output b is applied through th OR gate OR4 to the clear input terminal CL of the flip-flop D-FF1 to clear the latter and make the potential at its output terminal Q a "Low" level. The output b also applied through the OR gate OR5 to the clear input terminal CL of the flip-flop D-FF2 to clear the latter and make the poential at its output terminal Q a "Low" level. Accordingly, the output l of the OR gate OR6 becomes a "Low" level to make the output m of the NAND gate NA2 and the output n of the NAND gate NA3 "High" level so that the power supply to the motor M is stopped. This is to decelerate the motor M from the first given speed V1 to the second given speed v2.

As the output b of the OR gate OR1 becomes a "High" level in the form of a pulse, a "High" level pulse is applied through the OR gate OR1 to the clear input terminal CL of the counter CNT to clear the counter CNT.

When the output signal GS2 from the output port P11 turns from a "High" to a "Low" level, the signal selector circuit S1 selects the input signal to the input terminal I2, i.e. the output from the output terminal Q2 of the counter CNT and outputs the selected signal at the output terminal O1 of the signal selector circuit SL. The period from the commencement of counting to the time when the potential at the output terminal Q2 of the counter CNT becomes a "High" level, is determined to be equal to the period of the encoder pulse ENCP at the time when the revolutional speed v of the motor M is the second given value v2. The operation to regulate the revolutional speed of the motor M at v2 is the same as the operation for the regulation of the motor M at the speed v1 but the source of the selection input signal to the signal selector circuit SL.

Then, explanation will be made about the operation of the motor drive control circuit 6 in the short time energization mode with reference to the circuit diagrams of FIGS. 6 and 7 and the time chart shown in FIG. 9. It is to be noted that, like as the case described above, the time chart in FIG. 9 shows the case wherein "Low" level signals are output at the output ports P6 and P8 to drive the motor M in the direction to move the objective lens forward and that the following explanation will be made for that case.

In the short time energization mode, the output signals from the microcomputer 1 assume the following levels. The output signal GS0 from the output port P9 is a "Low" level, the output signal GS1 from the output port P10 is a "High" level, and the output signal GS2 is a "Low" level for the first type short time energization mode and a "Low" level for the second type short time energization mode.

The signal selector circuit SL selects the input terminal I3 when both the selection input signals Sl1 (GS1) and Sl3(l) and "High" levels and selects the input terminal I4 when the selection input signal Sl1 (GS1) is a "High" level and the selection input signal Sl3(l) is a "Low" level. The input terminal I3 of the signal selector circuit SL is connected with the output terminal Q3 of the counter CNT while the input terminal I4 of the signal selector circuit SL is connected with the output terminal Q4 of the counter CNT such that the output from either of the output terminals Q3 and Q4 is output from the output terminal O1 of the selector circuit S1 in accordance with the combination of the levels of the selection input signals Sl2 and Sl3. The period from the commencement of the counting by the counter CNT to the time when the potential at the output terminal Q3 of the counter turns to a "High" level, is determined to be equal to the period of power supply to the motor M in the short time energization mode. The period from the commencement of the counting to the time when the potential at the output terminal Q4 of the counter CNT, is determined to be equal to the limit period of the encoder pulse ENCP for the re-energization of the motor M in the short time energization mode.

Now, explanation is first made about the operation for controlling the driving of the motor in the first type short energization mode.

As the output signal SS from the output port P12 is at a "Low" level in this mode, the output signal i of the AND gate AN4 is also at a "Low" level. As the output signal GS1 from the output port P10 is at a "High" level, the output f of the AND gate AN2 is also at a "Low" level. The output k of the OR gate OR5 is a "High" level which is applied to the clear input terminal CL of the flip-flop D-FF2 so that the flip-flop D-FF2 has been cleared to output a "Low" level signal at its output terminal Q.

Under those conditions, if the signal $\overline{MF}$ output from the output terminal P6 of the microcomputer 1 for driving the motor M in the direction to move the objective lens forward, turns to a "Low" level at the time T10, the output a of the AND gate AN1 becomes a "Low" level and the output b of the OR gate OR1 also becomes a "Low" level. When the output b becomes a "Low" level, "Low" level signals are applied through the OR gate OR2 to the clear input terminal CL of the counter CNT and through the OR gate OR4 to the clear input terminal CL of the flip-flop D-FF1 so that the cleared condition of the counter CNT and the flip-flop D-FF1 is cancelled.

The "Low" level of the output a of the AND gate AN1 turns the output of the inverter circuit IV1 from a "Low" to a "High" level so that the one shot pulse generator circuit OSP3 outputs a "High" level short pulse. The short pulse presets the flip-flop D-FF1 through the OR gate OR3 so that the output at the output terminal Q of the flip-flop D-FF1 becomes a "High" level. As the result, the output l of the OR gate OR6 becomes a "High" level to make the output n of the NAND gate NA3 a "Low" level to effect the power supply to the motor M.

As the output l of the OR gate OR6 is a "High" level and the signal $\overline{SS}$ inverted from the output signal SS from the output port P12 is also a "High" level, the output of the NAND gate AN1 is a "Low" level to block the AND gate AN5 of which output h is a "Low" level. Accordingly, the turning of the encoder pulse ENCP from the "Low" to a "High" level at the time T11 and T12 will not affect the operation of the motor drive control-circuit 6 and the power supply to the motor M is continued.

When the potential at the output terminal Q3 of the counter CNT becomes a "High" level at the time T13, the output e of the signal selector circuit Sl becomes a "High" level since the signal selector circuit S1 has selected the input terminal I3. The turning of the output e to a "High" level turns the output g of the AND gate AN3 from a "Low" to a "High" level. In synchronization with the rising of the output g, the flip-flop D-FF1 latches the input signal to its input terminal D, i.e. the output from its own output terminal $\overline{Q}$. As the result, the potential at its output Q becomes a "Low" level and the potential at its output $\overline{Q}$ becomes a "High" level. When the potential at the output terminal Q of the flip-flop D-FF1 turns to a "Low" level, the output 1 of the OR gate OR6 becomes a "Low" level and the output n of the NAND gate NA3 becomes a "High" level to interrupt the power supply to the motor M.

At the same time, as the output signal $\overline{MB}$ from the output port P8 of the microcomputer 1 is a "Low" level, the output o of the OR gate OR7 becomes a "Low" level to brake the motor M. When the combination of the levels of the selection input signals Sl1 (GS1) and Sl3(l) is changed, the signal selector circuit SL selects the input terminal I4 to output at its output terminal o1 the output from the output terminal Q4 of the counter CNT. The output of the NAND gate NA1 also becomes a "High" level to unblock the AND gate AN5.

Under those condition, when the encoder pulse ENCP rises from a "Low" to a "High" level at the time T14 before the potential at the output terminal Q4 of the counter CNT becomes a "High" level, the revolutional speed v of the motor M has not lowered to the level requiring reenergization of the motor M. At this time, the rising of the encoder pulse ENCP causes a "High level signal to be applied through the delay circuit DLY2 to the one shot pulse generating circuit OSP4 which in turn outputs a "High" level short pulse. The short pulse is applied through the AND gate AN5 and the OR gate OR2 to the clear input terminal of the counter CNT to clear the CNT.

When the lowering of the revolution speed v of the motor M causes the counter CNT to count the given time and make the potential at its output terminal Q4 a "High" level at the time T15 before the encoder pulse ENCP turns from a "Low" to a "High" level, the output e of the signal selector circuit SL becomes a "High" level to turn the output g of the AND gate AN3 from a "Low" to a "High" level. In response to the rising of the output g, the flip-flop D-FF1 latch the input signal to its input terminal D, i.e. the output from its own output terminal $\overline{Q}$ so that the output from its output terminal Q will change to a "High" level.

Accordingly, the output l of the OR gate OR6 becomes a "High" level to make the output of the OR gate OR7 a "High" level to release the braking of the motor M. On the other hand, the "Low" level of the NAND gate NA3 causes the power supply to the motor M. The "High" level of the output l of the OR gate 6 makes the output of the NAND gate NA1 a "Low" level to block the AND gate AN5 of which output h becomes a "Low" level.

When the output e of the signal selector circuit SL turns from a "Low" to a "High" level, a "High" level signal is applied through the delay circuit DLY1 to the one shot pulse generator circuit OSP6 which in turn outputs a "High" level short pulse. The short pulse is applied through the OR gate OR2 to the clear input terminal CL of the counter CNT to clear the latter. Additionally, as the combination of the levels of the selection input signals Sl1 (GR1) and the Sl3 (l) changes, the signal selector circuit SL again selects the input terminal I3.

Subsequently, explanation will be made about the motor drive control for the second type short time energization mode.

In this mode, the levels of the output signals from the output ports P9 through P11 of the microcomputer 1 are the same as those in the first type short time energization mode, but the output signal SS of the output port P12 is a "High" level.

Figure 9:
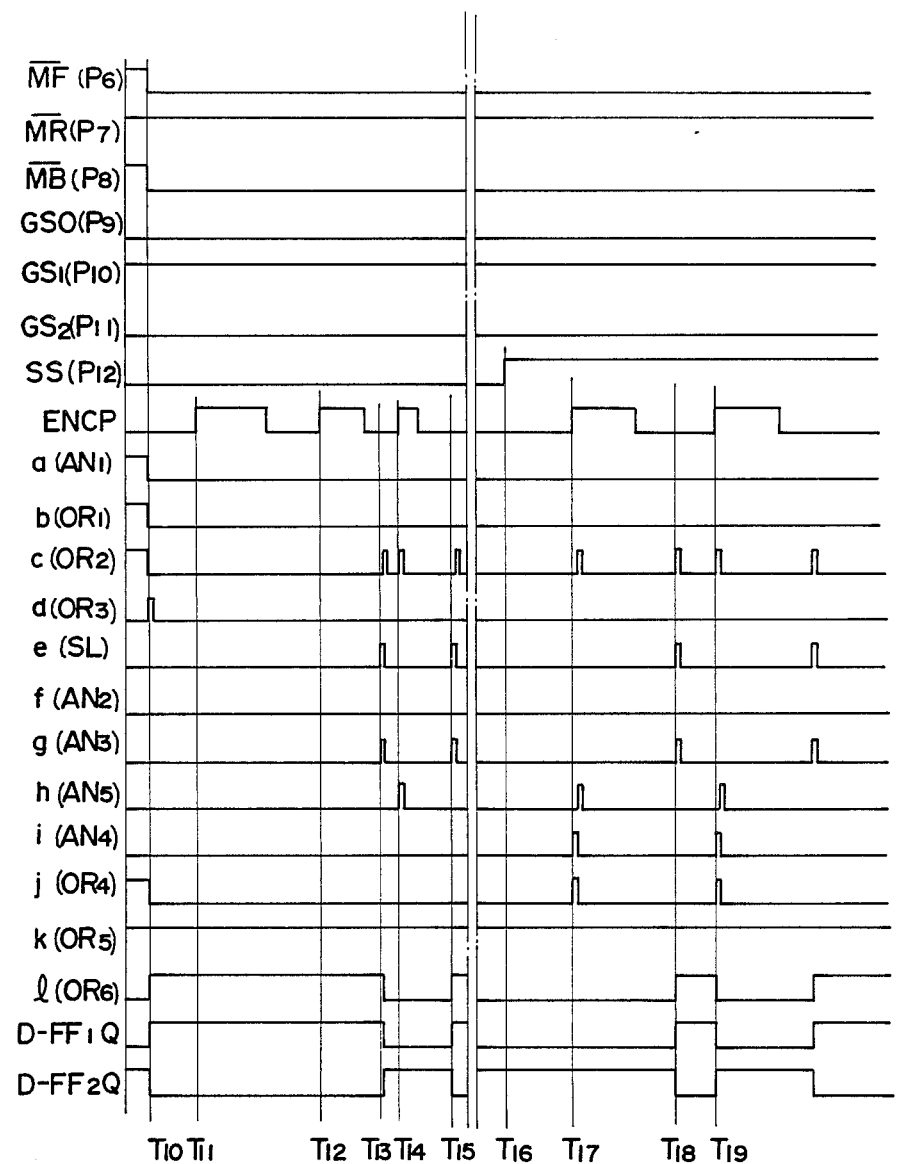

When the output signal SS becomes a "High" level at the time T16 in FIG. 9, the output of the NAND gate NA1 becomes a "High" level to unblock the AND gate AN5. As both the output signals GS1 and SS from the output ports P10 and P12 are "High" levels, the AND gate AN4 is unblocked. With reference to FIG. 9, the output l of the OR gate OR6 is a "Low" level and the motor M is not supplied with power at the time when the output signal SS turns from a "Low" to a "High" levels.

In the case when the encoder pulse ENCP rises from a "Low" to a "High" level at the time T17 before the output from the output terminal Q4 of the counter CNT changes from a "Low" to a "High" level, a "High" level signal is applied through the delay circuit DLY2 to the one shot pulse generator OSP4 which outputs a "High" level short pulse signal. The short pulse signal is applied through the AND gate AN5 and the OR gate OR2 to the clear input terminal CL of the counter CNT to clear the latter.

The one shot pulse generator OSP5 also outputs a "High" level short pulse signal, which is applied through an AND gate AN4 and the OR gate OR4 to the clear input terminal CL of the flip-flop D-FF1 to clear the latter. Accordingly, the output from the output terminal Q of the flip-flop D-FF1 remains at a "Low" level so that the motor M is not supplied with power.

Under those conditions, when the counter CNT completes the counting of the given time and the output from its output terminal Q4 rises from a "Low" to a "High" level at the time T18 before the encoder pulse ENCP rises from a "Low" to a "High" level, i.e. when the revolutional speed v of the motor M becomes lower than the lower limit value, the output e of the signal selector circuit SL becomes a "High" level since the signal selector circuit S1 has selected the input terminal I4.

The "High" level of the output e makes the output g of the AND gate AN3 a "High" level. In synchronization with the rising of the output g, the flip-flop D-FF1 latches the input signal to its input terminal D, i.e. the output from its own output terminal Q so that the potential at the output terminal Q so that the potential at the output terminal Q of the flip-flop D-FF1 becomes a "High" level and the potential at the output terminal $\bar{Q}$ of the same becomes a "Low" level. The "High" level the output from the output terminal Q of the flip-flop D-FF1 makes the output l of the OR6 a "High" level and accordingly the output n of the NAND gate NA3 a "Low" level so that power is supplied to the motor M.

Additionally the "High" level of the output e of signal selector circuit SL causes a "High" level signal to be applied through the delay circuit DLY1 to the one shot pulse generator circuit OSP6 which outputs a "High" level short pulse signal. The short pulse signal is applied through the OR gate OR2 to the clear input terminal CL of the counter CNT to clear the latter. On the other hand, as the combination of the levels of the selection input signals Sl1 (GS1) and Sl3(1) changes, the signal selector circuit SL selects the input terminal I3.

If the encoder pulse ENCP rises from a "Low" to a "High" level at the time T19 in FIG. 9 under the above described condition, the one shot pulse generator circuit OSP5 outputs a "High" level short pulse signal. The short pulse signal is applied through the OR gate OR4 to the clear input terminal CL of the flip-flop D-FF1 to clear the latter. As the result, the output from the output terminal Q of the flip-flop D-FF1 becomes a "Low" level to make the output l of the OR gate OR 6 a "Low" level so that the output n of the NAND gate NA3 a "High" level to interrupt the power supply to the motor M. At the same time, as the output signal $\overline{MB}$ from the output port P8 is a "Low" level, the output o of the OR gate OR 7 becomes a "Low" level to brake the motor M.

When the encoder pulse rises from a "Low" to a "High" level, a "High" level signal is applied through the delay circuit DLY2 to the one shot pulse generator circuit OSP4 which outputs a "High" level short pulse signal. The short pulse signal is applied through the AND gate AN5 and the OR gate OR2 to the clear input terminal CL of the counter CNT to clear the latter. On the other hand, as the combination of the levels of the selection input signals Sl1 (GS1) and SL3(l) changes, the signal selector circuit SL selects the input terminal I4. After that those operations are repeated.

Table 1 shows the levels at the output ports P6 through P12 of the microcomputer 1, i.e. of the control signals. In the table, the asterisk represents the signal level that does not affect the operation whether the level is "High" or "Low".

The levels at the output ports P10 through P12 may either be "High" or "Low" in the case of the continuous power supply, but are determined as shown in the table in consideration of the transition of the circuit to the constant speed regulation. Additionally, the control signal $\overline{MF}$ output from the output port P6 for driving the motor M in the direction to move the objective lens forward, and the control signal $\overline{MR}$ output from the output port P7 for driving the motor M in the direction to move the lens backward are inhibited from becoming "Low" levels.

TABLE 1

| Control signals | Driving condition | | | | | | | | | | |
|---|---|---|---|---|---|---|---|---|---|---|---|
| | Stopping | Continuous power supply | | Constant speed v1 | | Constant speed v2 | | Short time energization I | | Short time energization II | |
| | | FWD | BKW | FWD | BKW | FWD | BKW | FWD | BKW | FWD | BKW |
| P6 ($\overline{MF}$) | H | L | H | L | H | L | H | L | H | L | H |
| P7 ($\overline{MR}$) | H | H | L | H | L | H | L | H | L | H | L |
| P8 (MB) | H | L | | L | | L | | L | | L | |
| P9 (GS0) | * | H | | L | | L | | L | | L | |
| P10 (GS1) | * | L | | L | | L | | H | | H | |
| P11 (GS2) | * | H | | H | | L | | * | | * | |
| P12 (SS) | * | H | | H | | H | | L | | H | |

FWD: The direction of the motor driving to move the objective lens forward.
BKW: The direction of the motor driving to move the objective lens backward.

Table 2 shows the input signal source I1(Q1) through I4(Q4) to be selected in accordance with the combination of the levels of the selection input signals Sl1(GS1), Sl2(GS2) and Sl3(l) input to the signal selector circuit SL. In the table, the asterisk show the signal of which level does not affect the selection.

TABLE 2

| Selection input signals | | | Input signal sources |
|---|---|---|---|
| Sl1(GS1) | Sl2(GS2) | Sl3(l) | to be selected |
| L | H | * | I1(Q1) |
| L | L | * | I2(Q2) |
| H | * | H | I3(Q3) |
| H | * | L | I4(Q4) |

The revolutional speed v and the accuracy of stoppage of the motor M in the short time energization mode varies in accordance with the period from the commencement of the count by the counter CNT to the time when the potential at either output terminal Q3 or Q4 of the counter CNT. The relationship between the revolutional speed v and the accuracy of stoppage is that as the speed v increases the accuracy will be worse. Hence, a proper value for the period may be chosen depending on the given condition.

The above described embodiment employed the phase difference detection type automatic focusing system wherein the lights coming from an object to the photographed and passing through the different portions of the exit pupil of the objective lens are focused onto a CCD array of which outputs are processed by a microcomputer.

Besides such a passive type automatic focusing system, the present invention may be applied to an active type automatic focusing system which projects near infrared light or supersonic wave to the object and detects the reflected light or wave. In other words the application of the present invention is not restricted to a particular type of automatic focusing system but it is sufficient for the focus detecting device if it can detect whether or not the objective lens is focused on a desired target object. Thus, the trm "focus detecting device" should be interpreted to include all such types.

In the above embodiment, the shutter release button RB is provided with a pair of projections RBa and RBb such that the change-over switch S1 engaged by the projection RBa and thereby with the shutter release button RB being depressed beyond the first stroke and that both the change-over switch S1 and the release switch S2 are engaged by the projections RBa and RBb and closed thereby with shutter release button RB being depressed further beyond the second stroke. Instead of those construction, other construction may be employed. For example, the switches S0, S1 and S2 may be closed and opened fully electrically by a detector which detects the movement or the depressed stroke of the shutter release button by the change of capacitance or electromagnetic field. According the term "stroke detecting means" should be interpreted to include not only the mechanical detector like the mechanism of the embodiment but also the electrostatic, electromagnetic and other stroke detecting devices.

While there has been described a preferred form of the invention, obviously modifications and variations are possible in light of the above teachings. It is therefore to be understood that within the scope of the appended claims, the invention may be practiced otherwise than as specifically described.

What is claimed is:

1. A camera comprising:
   a shutter release button capable of responding to three manual operations that can be applied in the order of a first, a second and a third operation;
   a signal output means for outputting a first, a second and a third signal in response to the first, the second and the third manual operation of said shutter release button, respectively;
   an objective lens including a focus adjustment lens;
   a focus condition detecting means for detecting a focus condition of said objective lens and outputting the result of the focus condition detection;
   a driving means for driving said focus adjustment lens towards an in-focus position in accordance with the result of the focus condition detection;
   a control means for actuating, in response to the first signal, said focus condition detecting means and said driving means, and causing said driving means to resume the driving operation when said focus condition detecting means detects an out-of-focus condition even after an in-focus condition is initially attained while said signal output means outputs only the first signal, and to inhibit the further driving operation once an in-focus condition is attained while said signal output means outputs the second signal, and
   means for initiating an exposure operation in response to the third signal.

2. A camera as claimed in claim 1, further comprising:
   an alarm member;
   an alarm control means for energizing said alarm member for a given time in response to the attainment of an in-focus condition by said focus condition detecting means, and
   means for inhibiting the operation of said alarm control means while said signal output means outputs only the first signal.

3. A camera as claimed in claim 1, further comprising:
   a display means for displaying the attainment of an in-focus condition, and
   a display control means for controlling the display operation of said display means, said display means displaying an in-focus condition when said focus adjustment lens is moved to an in-focus position by said driving means with said signal output means outputting only the first signal, and displaying the in-focus condition when said focus adjustment lens is moved to an in-focus position and thereafter said focus condition detecting means outputs a signal representing the attainment of the in-focus condition with said signal output means outputting the second signal.

4. A camera as claimed in claim 1, further comprising:
   means for determining a focusing position in a low contrast subject scene, and
   means for permitting a low contrast focusing determination when said signal output means outputs only the first signal.

5. A camera as claimed in claim 2 wherein the alarm member is an audio buzzer.

6. A camera comprising:
   an objective lens;
   a focus condition detecting means for detecting a focus condition of said objective lens;
   a driving means for driving said objective lens to an in-focus position in accordance with the result of the focus condition detection and operable in a first and a second mode;
   means for changing over the first mode and the second mode;
   a control means for controlling the driving operation of said driving means to resume the driving operation when said focus condition detecting means detects an out-of-focus condition even after an in-focus condition is once attained with the first mode selected, and to inhibit the further driving operation once an in-focus condition is attained with the second mode selected;
   a buzzer;
   a buzzer control means for energizing said buzzer for a given time in response to the attainment of an in-focus condition, and
   means for inhibiting the operation of said buzzer control means when the first mode is selected.

7. A camera comprising:
   an objective lens;
   a focus condition detecting means for detecting a focus condition of said objective lens;

a driving means for driving said objective lens to an in-focus position in accordance with the result of the focus condition detection and operable in a first and a second mode;

means for changing over the first mode and the second mode;

a control means for controlling the driving operation of said driving means to resume the driving operation when said focus condition detecting means detects an out-of-focus condition even after an in-focus condition is once attained with the first mode selected, and to inhibit the further driving operation once an in-focus condition is attained with the second mode selected;

a display means for displaying the attainment of an in-focus condition, and a display control means for controlling the display operation of said display means, said display means displaying the in-focus attainment when said objective lens is moved to an in-focus position with the first mode selected, and displaying the in-focus attainment when said objective lens is moved to an in-focus position and thereafter said focus condition detecting means outputs a signal representing the attainment of in-focus condition with the second mode selected.

8. A camera comprising:

a shutter release button manually operable to be moved from an initial position to an exposure initiating position through a first position;

a switching means for electrically detecting a person touching on said shutter release button and generating a first signal in response to the person touching;

an objective lens;

an automatic focusing means actuatable in response to the first signal for detecting the focus condition of said objective lens and driving said objective lens towards an in-focus position in accordance with the focus condition detection;

a first stroke detecting means for generating a second signal when said shutter release button is moved beyond the first position to a second position;

an inhibiting means responsive to the second signal for inhibiting the operation of said automatic focusing means once the in-focus condition is attained;

a second stroke detecting means for generating a third signal when said shutter release button is moved beyond the second position to a third position to initiate an exposure operation;

means for determining an automatic focusing position in a low contrast subject scene, and means for permitting a low contrast focusing determination when the first stroke detecting means generates a second signal.

9. The camera as in claim 8 further including means for generating an auxiliary light in a low light condition, and means for inhibiting a determination of a low contrast focusing determination when the means for generating an auxiliary light is activated when a second signal is generated by the second switching means.

10. A camera comprising:

a shutter release button manually operable to be moved from an initial position to an exposure initiating position through a first position;

a switching means for electrically detecting a person touching on said shutter release button and generating a first signal in response to the person touching;

an objective lens;

an automatic focusing means actuatable in response to the first signal for detecting the focus condition of said objective lens and driving said objective lens towards an in-focus position in accordance with the focus condition detection;

a first stroke detecting means for generating a second signal when said shutter release button is moved beyond the first position to a second position;

an inhibiting means responsive to the second signal for inhibiting the operation of said automatic focusing means once the in-focus condition is attained;

a second stroke detecting means for generating a third signal when said shutter release button is moved beyond the second position to a third position to initiate an exposure operation, and means for generating an audio signal to the user to indicate inhibiting a continuation of the auto-focus mode of operation.

11. A camera comprising:

a shutter release button manually operable to be moved from an initial position to an exposure initiating position through a first position;

a switching means for electrically detecting a person touching on said shutter release button and generating a first signal in response to the person touching;

an objective lens;

an automatic focusing means actuatable in response to the first signal for detecting the focus condition of said objective lens and driving said objective lens towards an in-focus position in accordance with the focus condition detection;

a first stroke detecting means for generating a second signal when said shutter release button is moved beyond the first position to a second position;

an inhibiting means responsive to the second signal for inhibiting the operation of said automatic focusing means once the in-focus condition is attained;

a second stroke detecting means for generating a third signal when said shutter release button is moved beyond the second position to a third position to initiate an exposure operation, and means for permitting another cycle of automatic focusing detection prior to inhibiting the automatic focusing means and after the second signal is generated to verify the in-focus position.

* * * * *